United States Patent
Chujo et al.

(10) Patent No.: US 7,772,877 B2
(45) Date of Patent: Aug. 10, 2010

(54) OUTPUT BUFFER CIRCUIT, DIFFERENTIAL OUTPUT BUFFER CIRCUIT, OUTPUT BUFFER CIRCUIT HAVING REGULATION CIRCUIT AND REGULATION FUNCTION, AND TRANSMISSION METHOD

(75) Inventors: Norio Chujo, Tokyo (JP); Keiichi Yamamoto, Yamato (JP); Hisaaki Kanai, Yokohama (JP); Toru Yazaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/343,521

(22) Filed: Dec. 24, 2008

(65) Prior Publication Data
US 2009/0179666 A1 Jul. 16, 2009

(30) Foreign Application Priority Data
Dec. 28, 2007 (JP) .............................. 2007-339602

(51) Int. Cl.
*H03K 19/003* (2006.01)
(52) U.S. Cl. .......................................... 326/30; 326/83
(58) Field of Classification Search .................... 326/30, 326/82–83, 86–87; 327/108–109, 333
See application file for complete search history.

(56) References Cited

U.S. PATENT DOCUMENTS 6,737,887 B2 * 5/2004 Forbes et al. ................... 326/86
6,803,790 B2 * 10/2004 Haycock et al. ............... 326/82
2003/0193351 A1 10/2003 Fukui
2008/0265944 A1 * 10/2008 Muraoka et al. .............. 326/86

FOREIGN PATENT DOCUMENTS

| JP | 2003-309461 | 10/2003 |
|---|---|---|
| JP | 2007-251469 | 9/2007 |

* cited by examiner

*Primary Examiner*—James Cho
(74) *Attorney, Agent, or Firm*—Antonelli, Terry, Stout & Kraus, LLP.

(57) ABSTRACT

An output buffer circuit, a differential output buffer circuit, an output buffer circuit having a regulation circuit and a regulation function, and a transmission method, to improve resolution of a pre-emphasis amount without increasing power consumption or a circuit area. The output buffer includes a delay circuit, an inverter and output buffers to transmit a logical signal to a transmission line and generate a waveform having four or more types of signal voltages on a transmission side according to a signal attenuation amount of the transmission line. The output buffer has a selector and a variable resistance portion at an output resistance to change a pre-emphasis amount according to a change in a variable resistance value. The inverter is configured to select a signal to input into the output buffer, invert a data signal and adjust a tap pre-emphasis amount by a select signal of the selector logic.

11 Claims, 10 Drawing Sheets

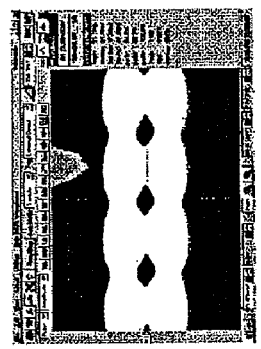
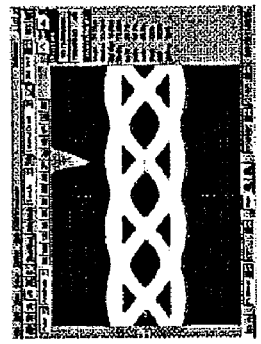
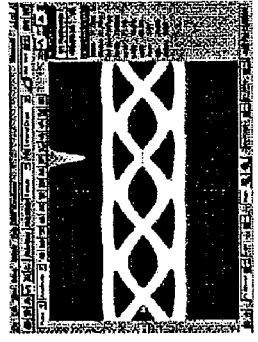
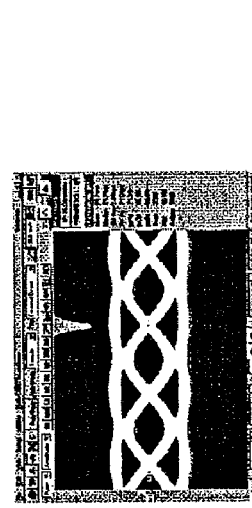
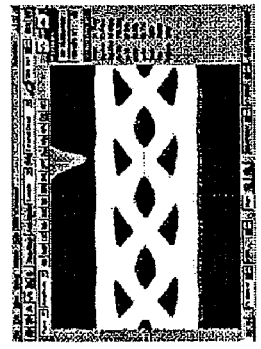
FIG. 9A
RESOLUTION 1/24
FIG. 9B
RESOLUTION 1/48

OUTPUT BUFFER CIRCUIT, DIFFERENTIAL OUTPUT BUFFER CIRCUIT, OUTPUT BUFFER CIRCUIT HAVING REGULATION CIRCUIT AND REGULATION FUNCTION, AND TRANSMISSION METHOD

The present application is based on and claims priority of Japanese patent application No. 2007-339602 filed on Dec. 28, 2007, the entire contents of which are hereby incorporated by reference.

BACKGROUND OF THE INVENTION

1. Field of the Invention

The present invention relates to an output buffer circuit for transmitting a logical signal to a transmission line and, in particular, to an output buffer circuit, a differential output buffer circuit, an output buffer circuit having a regulation circuit and a regulation function and a transmission method, capable of improving resolution of a pre-emphasis amount of, particularly a CMOS output circuit, by applying a pre-emphasis to a transmission output waveform for the purpose of compensating for signal attenuation of the transmission line.

2. Description of the Related Art

An electronic circuit apparatus, requiring an operating speed which has become higher year after year, has been actively researched and developed to implement the higher operating speed. The high-speed electronic circuit apparatus provides advantages such as short-time implementation of even the processing for which conventionally it had taken much time or the processing which had been thought to be impossible. In addition, the high-speed electronic circuit apparatus can reduce processing cost and contribute to improvement of services in the world. Further, to manufacture such an excellent apparatus, the industrial world becomes more activated.

For implementation of such a high-speed electronic circuit apparatus, there have increased demands of high speed transmission of data transmission signals between LSI internal circuits which are components of an electronic circuit apparatus, between LSIs, between printed circuit boards, between apparatuses and between housings.

As one of high-speed techniques of data transmission, for example, there has been known a technique of preventing generation of garbled data due to reflected waves by disposing a termination resistance matched with a characteristic impedance of a transmission line at a signal receiving unit to prevent reflection of a received signal, as disclosed in Japanese Patent Laid-Open Publication No. 2003-309461.

Further, to compensate for signal attenuation in LSI internal wiring, LSI package wiring, printed circuit board wiring and a transmission line represented by a cable or a connector, there has been practically used an output buffer circuit with a pre-emphasis function which increases a signal amplitude of a high-frequency component of a signal or reduces a signal amplitude of a low-frequency component.

In addition, a CMOS-type output circuit has been used to increase a processing volume of an electronic circuit apparatus by increasing the number of circuits for connecting between LSI internal circuits, between LSIs, between printed circuit boards, between apparatuses or between housings without increasing power consumption.

Referring to FIG. 8, a pre-emphasis will be described below. The pre-emphasis highlights an edge of a waveform to compensate for damage to a printed circuit board wiring. It is shown that presence or absence of a pre-emphasis highlights an edge of a driver waveform or a receiver input waveform.

The resolution of the pre-emphasis requires approximately $\frac{1}{48}$ in view of automatic adjustment of an emphasis amount and a CMOS-type output circuit has the following drawback: a circuit scale increases with resolution. FIGS. 9A and 9B illustrate examples of resolutions of $\frac{1}{24}$ and $\frac{1}{48}$.

FIGS. 10A and 10B illustrate circuits in emphasis resolutions of $\frac{1}{5}$ and $\frac{1}{10}$. It is understood that an emphasis resolution of $\frac{1}{10}$ enlarges a circuit scale. FIG. 10C is an example of the present invention and detailed description will be made later, which illustrates that even an emphasis resolution of $\frac{1}{10}$ does not cause so large circuit scale. An output impedance deviates from a characteristic impedance of a transmission line, but a circuit is divided into five portions, which can control a difference to several Ω or less.

Japanese Patent Laid-Open Publication No. 2007-251469 proposes an output buffer circuit or the like, which is formed with a selector for switching to prevent an output impedance from being changed by an emphasis amount.

In a technique disclosed in Japanese Patent Laid-Open Publication No. 2003-309461, an output impedance may be largely different from a characteristic impedance of a transmission line, depending upon an emphasis amount. In that case, waveform quality is deteriorated by a reflected wave.

A technique disclosed in Japanese Patent Laid-Open Publication No. 2007-251469 uses a selector to prevent an output impedance from changing due to an emphasis amount by switching and makes variable a resistor for setting the output impedance to the same as a characteristic impedance of a transmission line and therefore five resistors generally have required to obtain the same value or to change, keeping the same ratio.

SUMMARY OF THE INVENTION

The present invention is an output buffer circuit, a differential output buffer circuit, an output buffer circuit having a regulation circuit and a regulation function and a transmission method, capable of improving resolution of a pre-emphasis amount, in a CMOS output circuit, without increasing the number of circuits in parallel, that is, without increasing power consumption or a circuit area.

The present invention is an output buffer circuit having a function which includes a delay circuit for delaying an input signal for a certain period of time, an inverter for inverting an input signal and output buffers to transmit a logical signal to a transmission line and generate a waveform having four or more types of signal voltages on a transmission side according to a signal attenuation amount of the transmission line and the output buffer has a variable resistance portion at an on-resistance to change a pre-emphasis amount according to a change in a variable resistance value.

Further, the present invention is a transmission method using an output buffer circuit having a function which includes a delay circuit for delaying an input signal for a certain period of time, an inverter for inverting an input signal and output buffers to transmit a logical signal to a transmission line and generate a waveform having four or more types of signal voltages on a transmission side according to a signal attenuation amount of the transmission line. The output buffer has a selector at a forward stage thereof and a variable resistance portion at an on-resistance. The inverter is configured so as to select a signal input into the output buffer by a selector logic, invert a data signal, adjust a pre-emphasis amount by a select signal of the selector logic and change a pre-emphasis amount by changing a variable resistance value.

The present invention provides an output buffer circuit, a differential output buffer circuit, an output buffer circuit having a regulation circuit and a regulation function and a transmission method, capable of improving resolution of a pre-emphasis amount without increasing power consumption or a circuit area.

These and other objects, features and advantages of the invention will be apparent from the following more particular description of preferred embodiments of the invention, as illustrated in the accompanying drawings.

BRIEF DESCRIPTION OF THE DRAWINGS

FIG. 9A is a view illustrating a waveform while an emphasis amount is being automatically adjusted at a resolution of $1/24$;

FIG. 9B is a view illustrating a waveform while emphasis amount is being automatically adjusted at a resolution of $1/48$ with no waveform change;

DESCRIPTION OF THE PREFERRED EMBODIMENTS

Figure 1:
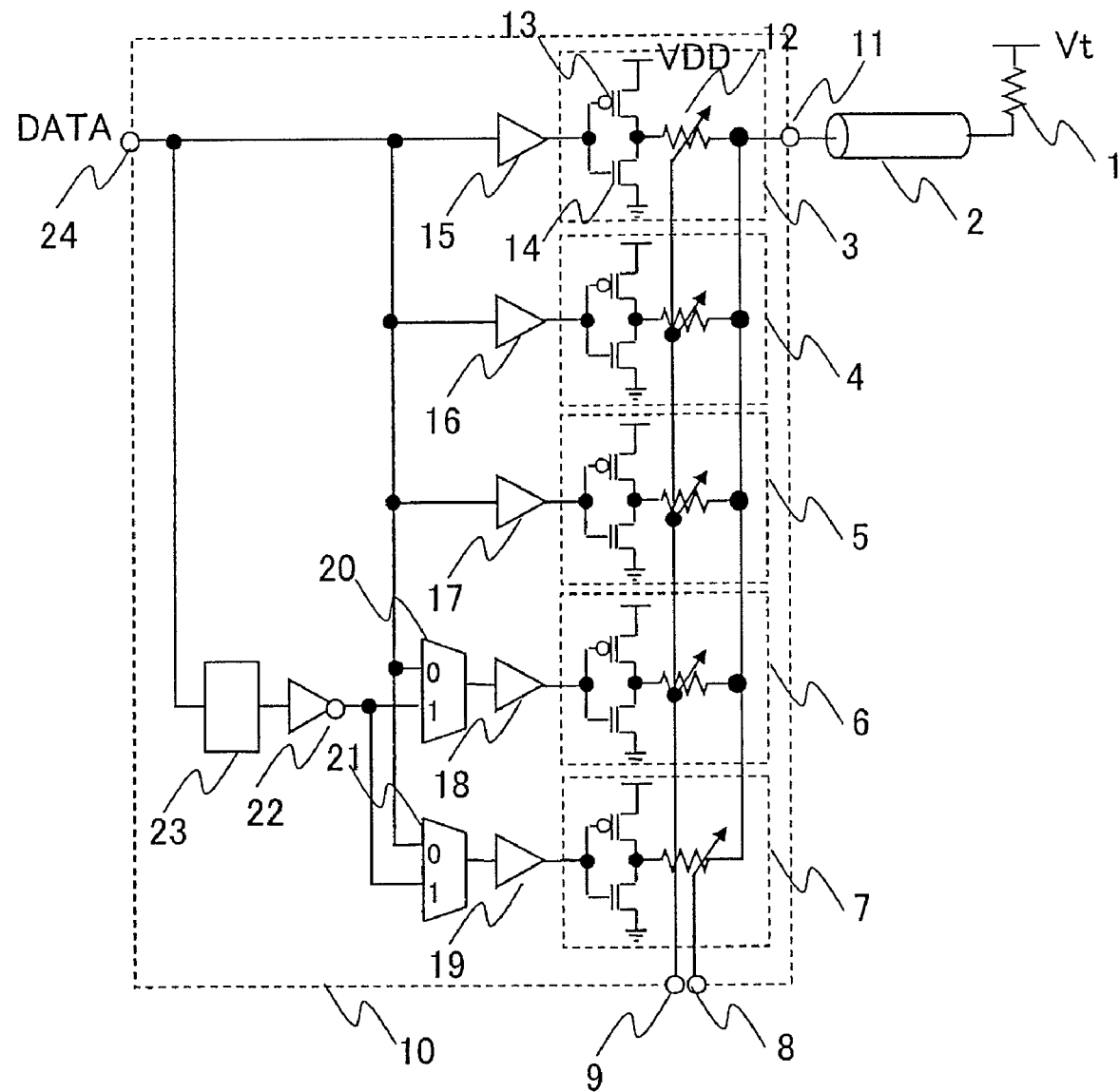
FIG. 1 is a view illustrating an output buffer circuit.

Now, description will be made on the present invention: an output buffer circuit, a differential output buffer circuit, an output buffer circuit having a regulation circuit and a regulation function and a transmission method, capable of improving resolution of a pre-emphasis amount, in a CMOS output circuit, without increasing the number of circuits in parallel, that is, without increasing power consumption or a circuit area.

The present invention is an output buffer circuit having a function which includes a delay circuit for delaying an input signal for a certain period of time; an inverter for inverting an input signal; and an output buffer to transmit a logical signal to a transmission line and generate a waveform having a signal voltage of class 4 or higher on a transmission side according to a signal attenuation amount of the transmission line, and the output buffer has a variable resistance portion at an on-resistance to change a pre-emphasis amount by changing the variable resistance value.

The output buffer has a selector at a forward stage thereof and has the variable resistance portion at the on-resistance. The inverter can select a signal input in the output buffer according to a selector logic and inverts a data signal and adjusts a tap pre-emphasis amount, by a select signal of the selector logic, so that the pre-emphasis amount is changed according to a change in the variable resistance value.

The output buffer has a selector at a forward stage thereof and a variable resistance portion at the on-resistance and is connected to a plurality of parallel circuits.

The selector changes a resolution having large emphasis amount and the variable resistance portion of the output buffer changes a resolution having a small emphasis amount.

The output buffer has a selector at a forward stage thereof and includes a P-type transistor and an N-type transistor complementarily operated by an input signal connected between a high-level power supply and a low-level power supply. The selector is configured so as to select a signal to be input into the output buffer by the selector logic with either one or both of a data signal indicating a logical value of a buffer output and an inverting signal of a data signal as an input. The on-resistance of the each output buffer is determined so that a parallel synthetic resistance value of the on-resistance of two or more output buffers becomes a desired pre-emphasis amount at a variable resistance portion before fine adjustment, the pre-emphasis amount of each tap is adjusted by a select signal of the selector logic and the transmission line is terminated by a termination resistance connected to a termination voltage at a receiving end.

Moreover, the variable resistance portion of the output buffer includes a pass gate constructed from a variable power supply and a transistor and a resistance value of the pass gate is made variable by a voltage value of a variable power supply.

Further, the variable resistance portion of the output buffer includes a variable resistor connected between the P-type transistor and the N-type transistor.

At the variable resistance portion of the output buffer, a P-type transistor connected with a variable power supply is connected to the P-type transistor and, an N-type transistor connected with a variable power supply is connected to the N-type transistor.

The receiving end termination style of the transmission line is a Thevenin's termination connected to a high-level power supply and a low-level power supply.

Further, the present invention is a differential output buffer circuit constructing a differential output buffer by including two systems of output buffer circuits.

The present invention is a regulation circuit connected to an output buffer circuit, including the same replica output buffer circuit as the output buffer of the output buffer circuit, a resistor, two or more sets of replica set circuits formed from a voltage comparator and a switch for selecting one of the two or more replica set circuits. A resistance value of the resistor in the replica set circuit is the product of a resistance value of a receiving termination resistance and an integral multiple of the number of the output buffer. The voltage comparator is configured so as to select either one of a termination voltage of a transmission line applied to a connection portion of the variable resistor of the replica output buffer circuit with the resistance of the replica set circuit or a voltage value of a half as large as a termination voltage of the transmission line.

Moreover, the present invention is an output buffer circuit with a regulation function, having an output buffer circuit and a regulation circuit and is configured so that a variable resistance portion of an output buffer of the output buffer circuit can be regulated by the regulation circuit.

Further, the present invention is a transmission method using: a delay circuit for delaying an input signal for a certain period of time; an inverter for inverting an input signal; and an output buffer and uses an output buffer circuit including a function for transmitting a logical signal to a transmission line and generating a waveform having four or more types of signal voltages on a transmission side according to a signal attenuation amount of the transmission line. The output buffer has a selector circuit at a forward stage thereof and a variable resistance portion at an on-resistance. The inverter is configured so as to select a signal input into the output buffer by a selector logic, invert a data signal, adjust a tap pre-emphasis amount by a select signal of the selector logic and change a pre-emphasis amount by changing a variable resistance value.

Referring now to the drawings, description will be made on one embodiment of an output buffer circuit, a differential output buffer circuit, an output buffer circuit having a regulation circuit and a regulation function and a transmission method of the present invention.

FIG. 1 is a configurational view illustrating a circuit according to an embodiment of the present invention. The output buffer circuit of the present embodiment is a transmission line drive circuit which includes: buffers 3 to 7 connected in parallel; prebuffer circuits 15 to 19; selector circuits 20, 21; an inverter 22; a delay circuit 23; an input terminal 24, an output terminal 11 and resistance adjusting terminals 8, 9 of the output buffers. With a data signal as an input, a transmission signal is output to a transmission line (printed circuit board wiring, cable) 2 connected to an output terminal 11.

The transmission line 2 is connected to a termination voltage Vt at a receiving end through a termination resistance 1 and the termination resistance 1 is made to be equal to a characteristic impedance of the transmission line to prevent generation of a reflected wave due to mismatched impedance. In the embodiment, the receiving end of the transmission line is subjected to receiving termination resistance 1 which connects the transmission line to a termination voltage Vt at a receiving end of the transmission line, but may be subjected to Thevenin's termination.

The delay circuit 23 outputs a signal for delaying an input signal for a certain period of time represented by a period for one cycle of a data signal, into the inverter 22. A delay signal from the inverter 22 becomes an input signal for the selector 20 and the selector 21.

The buffers 3 to 5 have a PMOS transistor 13, an NMOS transistor 14 and a variable resistor 12, respectively, inputs an input signal from the input terminal 24 through the prebuffers 15 to 17 and outputs the signal into an output terminal 11.

Buffers 6, 7 have the PMOS transistor 13, the NMOS transistor 14 and the variable resistor 12 and an input signal from the input terminal 24 selected with the selectors 20, 21 or an input signal from the input terminal 24 through a delay circuit 23 and the inverter 22 is input through prebuffers 18, 19 and output into an output terminal 11.

The resistance values of the variable resistors 12 of the buffers 3 to 7 are changed together by input signals from resistance adjusting terminals 8, 9. The variable resistors of the buffer 7 are changed by one operation and individually.

In the present embodiment, the number of the output buffers is five or more and the output buffers for each tap may be weighed like ×1, ×2, ×4 . . . In that case, as a buffer of ×1, the following two buffers are required: a buffer having a resistance value capable of being individually changed and a buffer having a resistance value capable of being concurrently changed.

In the present embodiment, with the number of the taps set to two or more, increasing the number of the selectors 20, 21 and the delay circuits 23 can switch signals up to the number of taps of two or more.

In the present embodiment, the number of resistors connected to the resistance adjusting terminal 8 and capable of being individually changed is less than that of resistors connected to the resistance adjusting terminal 9 and capable of being concurrently changed.

Figure 2:
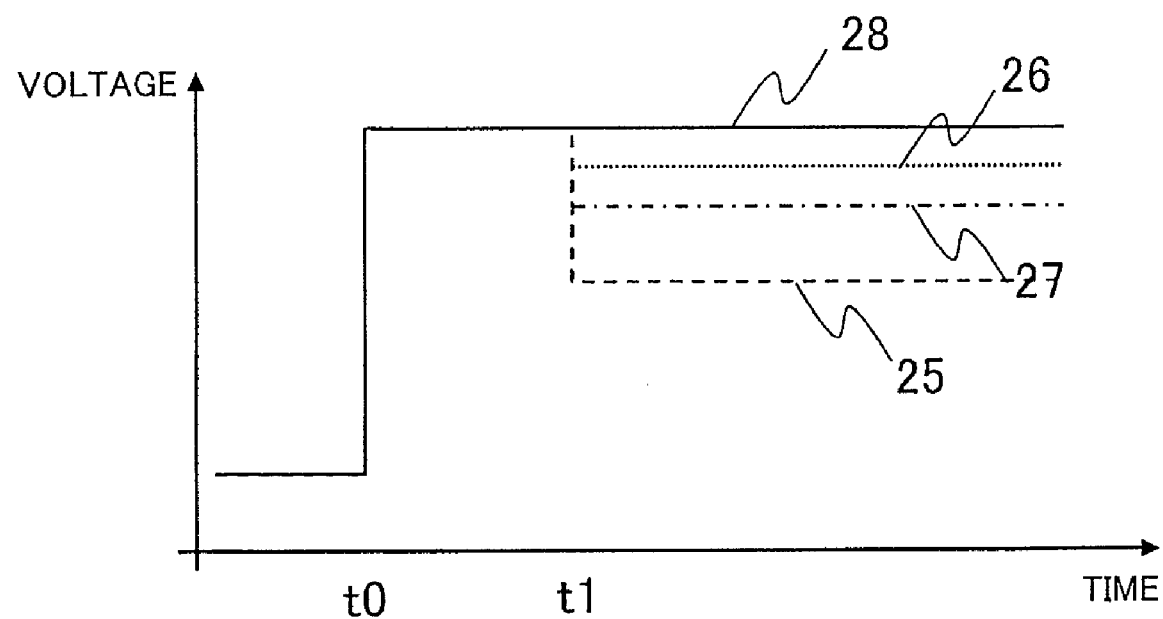
FIG. 2 is a view illustrating a waveform from an output terminal of an output buffer circuit.

Referring to FIG. 2, the output voltage of an output terminal in the present embodiment will be described below. A waveform 28 of the output terminal 11 illustrates a case in which both of the selectors 20, 21 select 0. A waveform 27 illustrates a case in which the selector 20 selects 0 and the selector selects 1. A waveform 25 illustrates a case in which both of the selectors 20, 21 select 1. A waveform 26 illustrates in a case in which the selector 20 selects 0 and the selector 21 selects 1 and a resistance value of the resistor connected to the resistance adjusting terminal 8 is twice as large as that connected to the resistance adjusting terminal 9. In each of these waveforms, the edge of the waveform is highlighted by reduction in voltage after lapse of a delay amount (t1−t0) of the delay circuit 23, thus enabling compensation for loss of a transmission line.

When the resistance value connected to the resistance adjusting terminal 8 is increased to twice as large as the resistance value of the resistor connected to the resistance adjusting terminal 9, the waveform 26 illustrates a middle voltage between the waveforms 27 and 28. A waveform obtained by increasing a resistance value of the resistor connected to the resistance adjusting terminal 8 to twice as large as that connected to the resistance adjusting terminal 9 with both of the selectors 20, 21 set at 1 illustrates a middle voltage between the waveforms 25 and 27. Specifically, by doubling a resistance value of the resistor connected to the resistance adjusting terminal 9, the voltage regulation resolution of a waveform can be increased more than when switching only the selector.

Only a resistance value of the resistor connected to the resistance adjusting terminal 8 is made variable and therefore output impedance of the output buffer circuit is not so largely changed nor causes waveform deterioration due to reflection.

By setting a resistance value of the resistor connected to the resistance adjusting terminal 8 to a value except the value obtained by doubling a resistance value of the resistor connected to the resistance adjusting terminal 9, the voltage regulation resolution of a waveform can be further increased.

Figure 3:
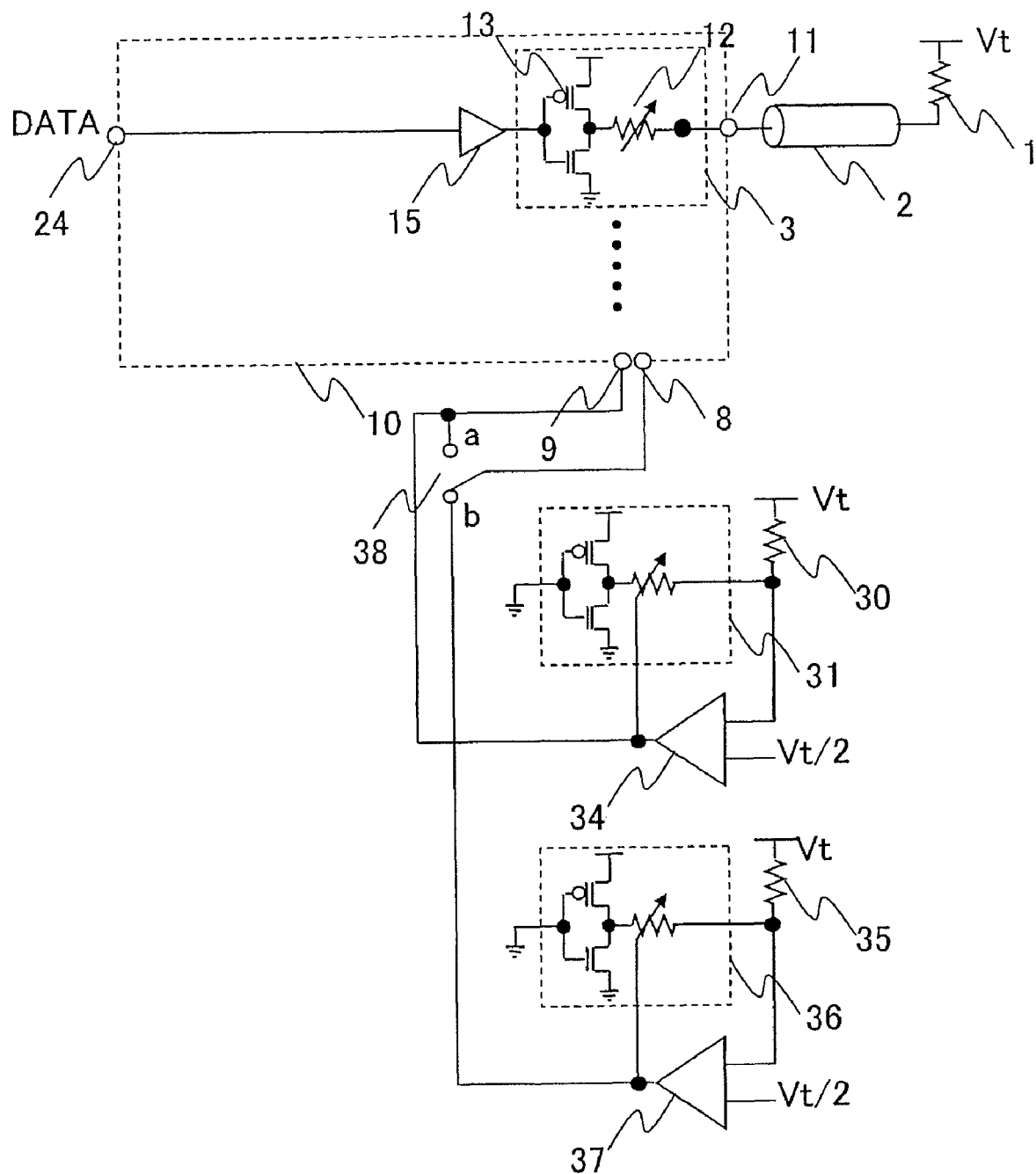
FIG. 3 is a view illustrating an output buffer circuit and a regulation circuit.

Referring to FIG. 3, the regulation circuit connected to the resistance adjusting terminals 8, 9 of the output buffer circuit according to the present embodiment will be described below. The regulation circuit includes the same replica output buffer circuit as the output buffer of the output buffer circuit, a resistor, two sets of replica set circuits formed from a voltage comparator and a switch for selecting one of the two or more replica set circuits. A resistance value of the resistor in the replica set circuit is the product of a resistance value of a receiving termination resistance and the number of the output buffer and twice to triple thereof. The voltage comparator compares a termination voltage of a transmission line applied to a connection portion of the variable resistor of the output buffer with the resistance of the replica set circuit with a voltage value of a half as large as a termination voltage of the transmission line and outputs a differential voltage thereof. By a differential voltage thereof, a resistance value of the variable resistor in the replica output buffer circuit is adjusted to be the same value as a resistor connected to the replica circuit, for example, a resistor 30.

The regulation circuit according to the present embodiment will be described in detail below. In FIG. 3, the regulation circuit is one of replica output buffer circuits 31, 36 and is the same circuit as the output buffer circuit 3. A resistance value of the resistor 30 is a resistance value of the resistor 1×the number of output buffers. A resistance value of a resistor 35 is twice to triple as large as the resistance value of the resistor 30. By selecting a switch 38 after comparison with Vt/2 using voltage comparators 34, 37, resolution can be increased and, by making a selection on (b) side, high resolution can be achieved. Further, higher resolution can be achieved by attaching one more replica output buffer circuit and increasing a resistance value to four to six times as large as a resistance value of the resistor 30.

Figure 4:
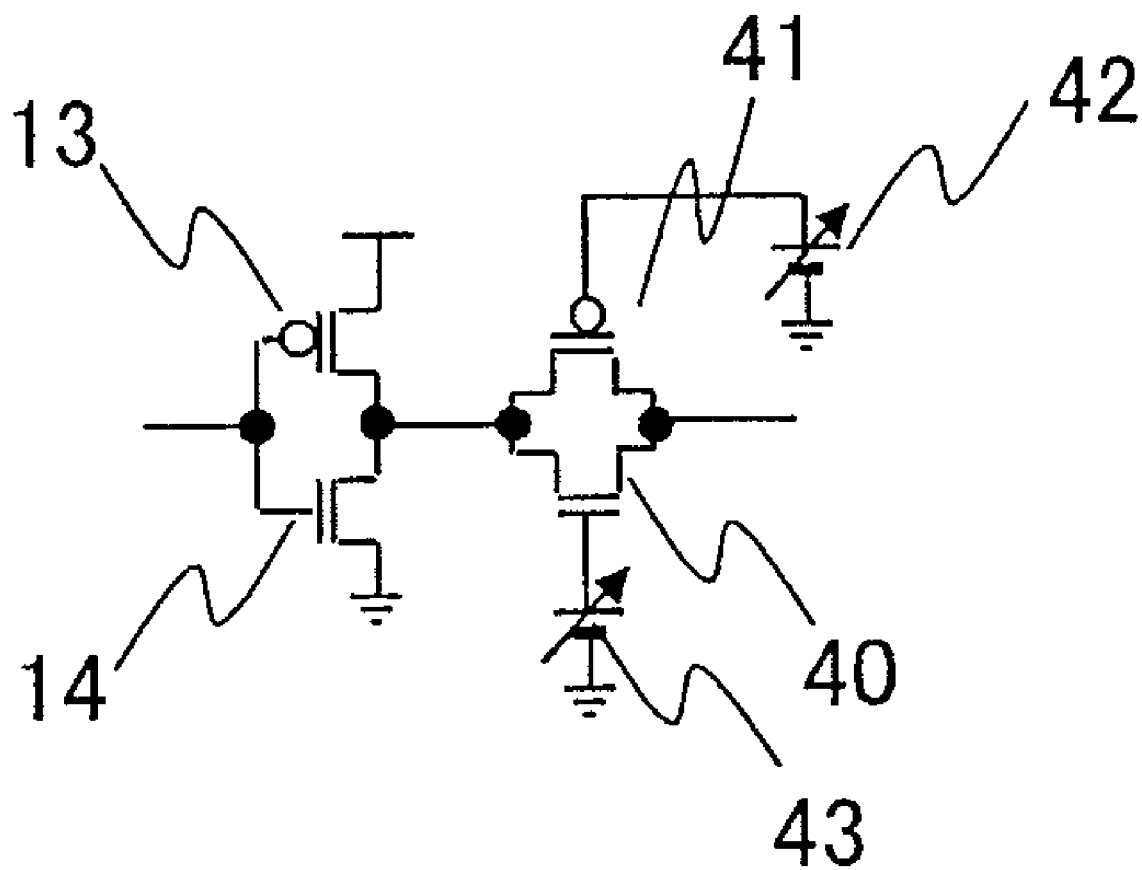
FIG. 4 is a view illustrating a variable resistor in an output buffer circuit.
Figure 5:
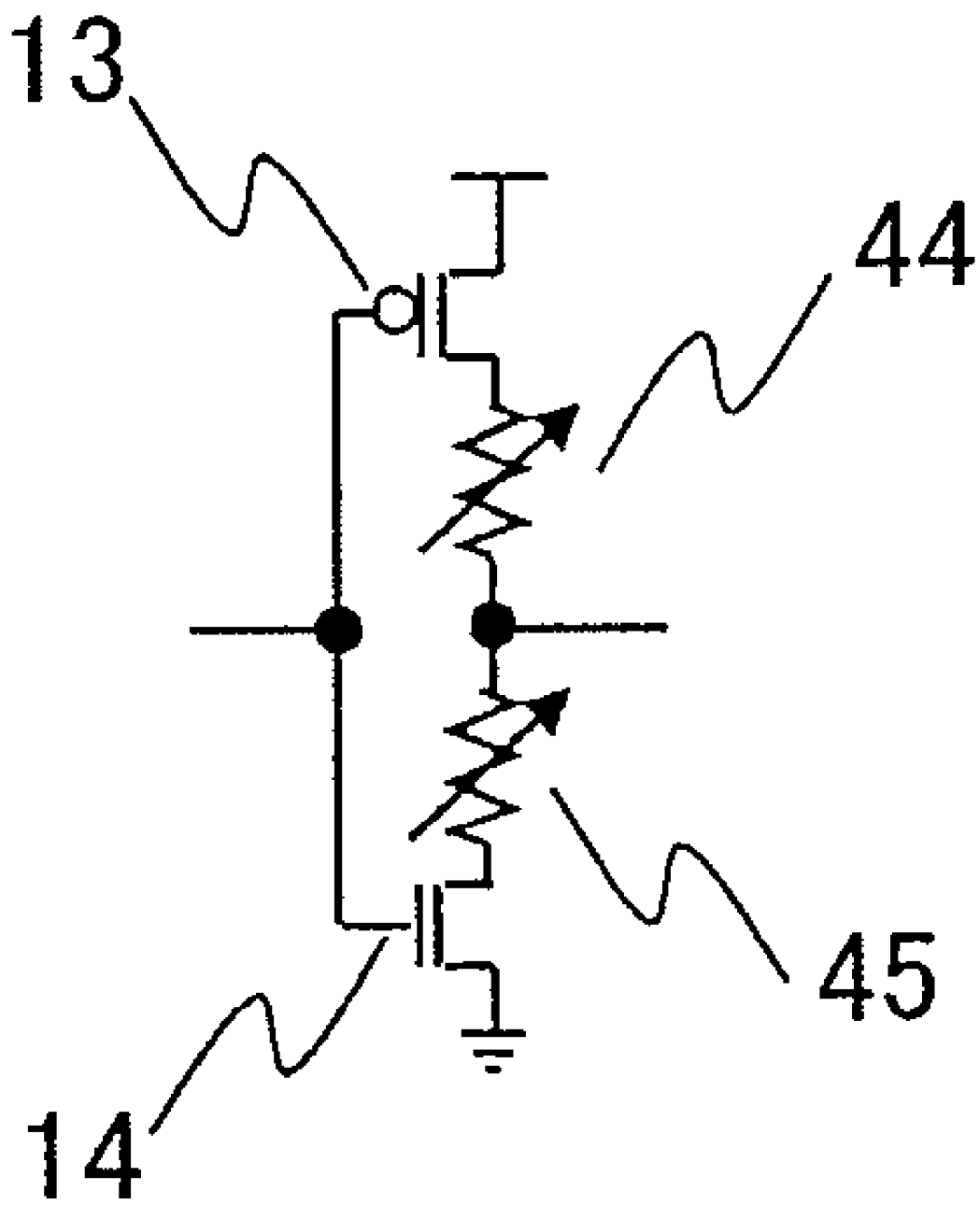
FIG. 5 is a view illustrating another example of a variable resistor in an output buffer circuit.
Figure 6:
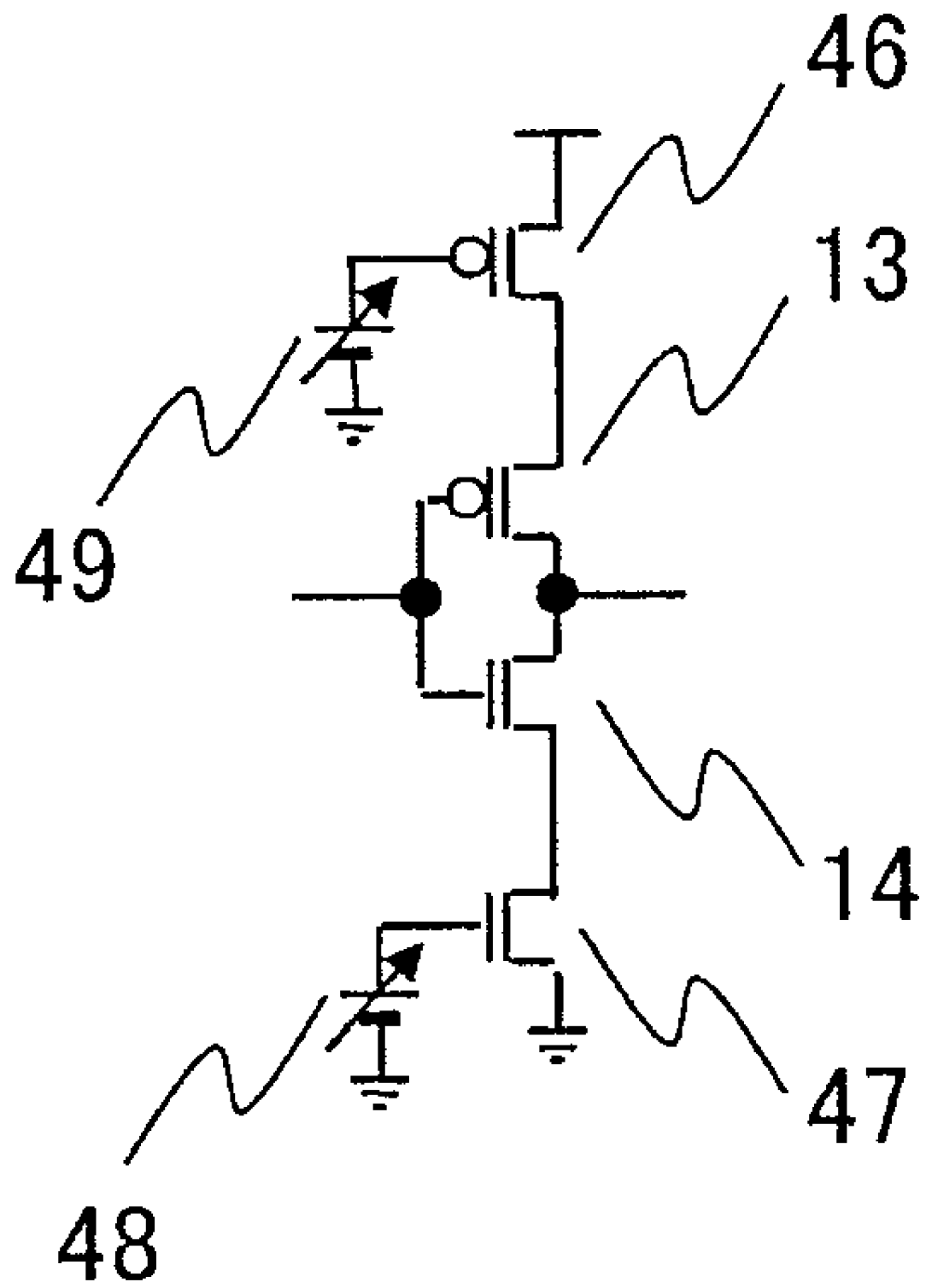
FIG. 6 is a view illustrating a varying method for output buffer resistance value.

Referring to FIGS. 4 through 6, a method for implementing the variable resistor in the output buffer circuit according to the present embodiment will be described below. FIG. 4 illustrates an example configured of a pass gate forming a resistor of the output buffer from transistors 40, 41. By changing voltages of the variable power supplies 42, 43 connected to a gate of each of the transistors 40, 41, a resistance value of the pass gate constituted of the transistors 40, 41 can be made variable.

FIG. 5 illustrates another example of the variable resistor according to the present embodiment. Variable resistors 144, 145 may be connected to between the PMOS transistor 13 and the NMOS transistor 14 without connecting to the output buffers 3 to 7 in series. A variable resistor can be achieved by using the NMOS transistor, PMOS transistor and the pass gate illustrated in FIG. 4.

FIG. 6 illustrates another example of a method for varying a resistance value of the output buffer according to the present embodiment. A PMOS transistor 46 is connected to between the PMOS transistor 13 and a high-level power supply and a variable power supply 49 is connected to a gate terminal of the PMOS transistor 46. Similarly, an NMOS transistor 47 is connected to between the NMOS transistor 14 and a low-level power supply and a variable power supply 48 is connected to a gate terminal of the NMOS transistor 47. By changing voltage values of the variable power supplies 49, 48, the current amount running through the transistors 13, 14 is adjusted, thus making a resistance value of the output buffer variable.

Using a resistance varying unit as illustrated in FIGS. 4 through 6 and resistance adjusting means as illustrated in FIG. 3, a resistance value connected to the resistance adjusting terminal 8 illustrated in FIG. 1 can be set to a certain value such as a value obtained by doubling a resistance value of the resistor connected to the resistance adjusting terminal 9, thus increasing a voltage regulation resolution of a waveform.

Figure 7:
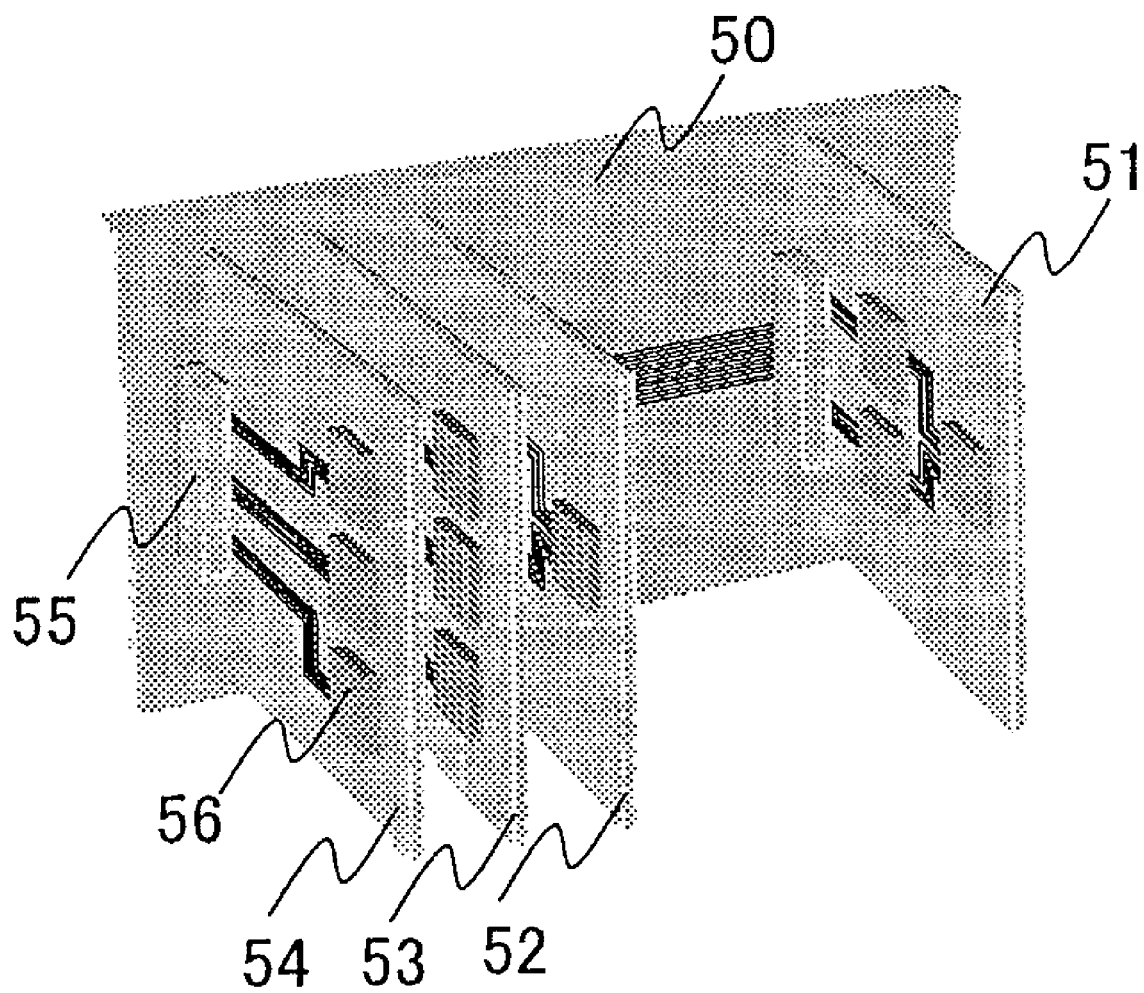
FIG. 7 is a view illustrating a detailed configurational example of an output buffer circuit.
Figure 8:
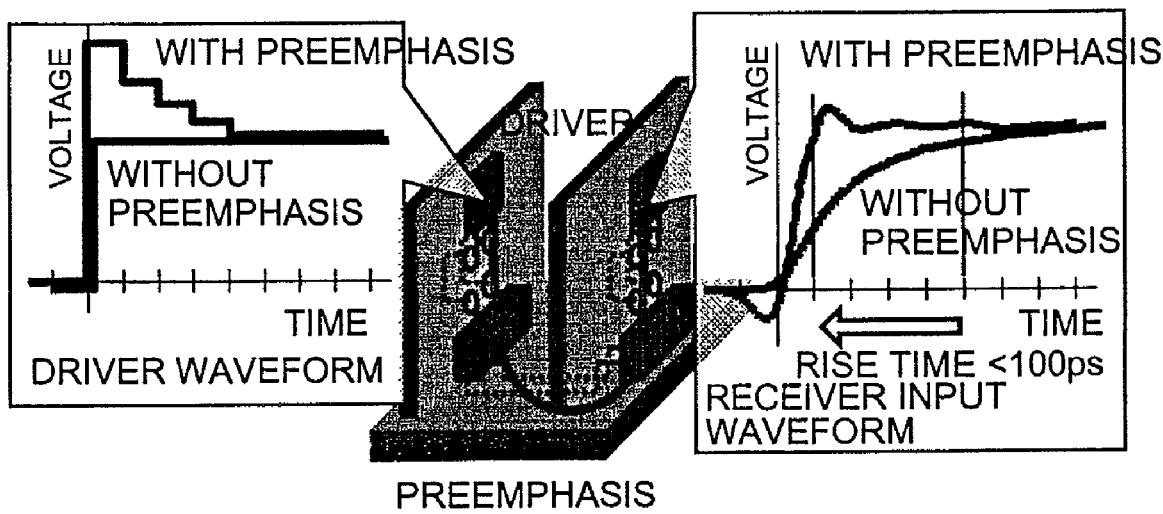
FIG. 8 is a view illustrating a pre-emphasis.
Figure 10C:
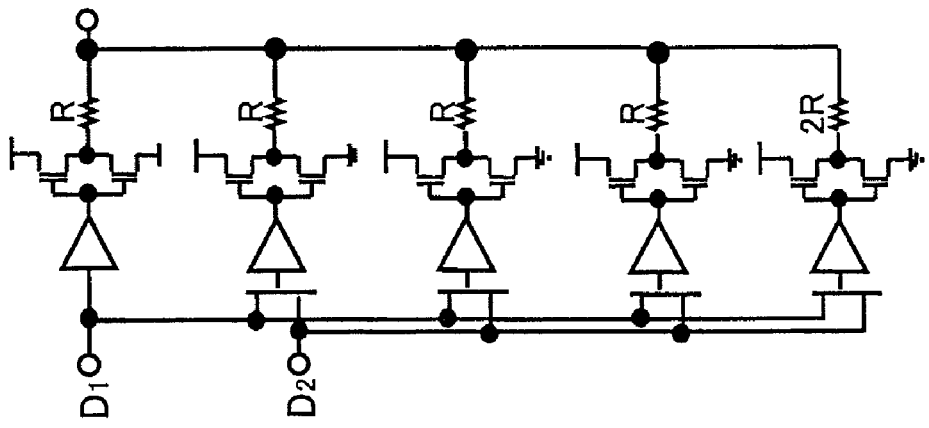
FIG. 10C is a view illustrating one example of the present invention.
Figure 10B:
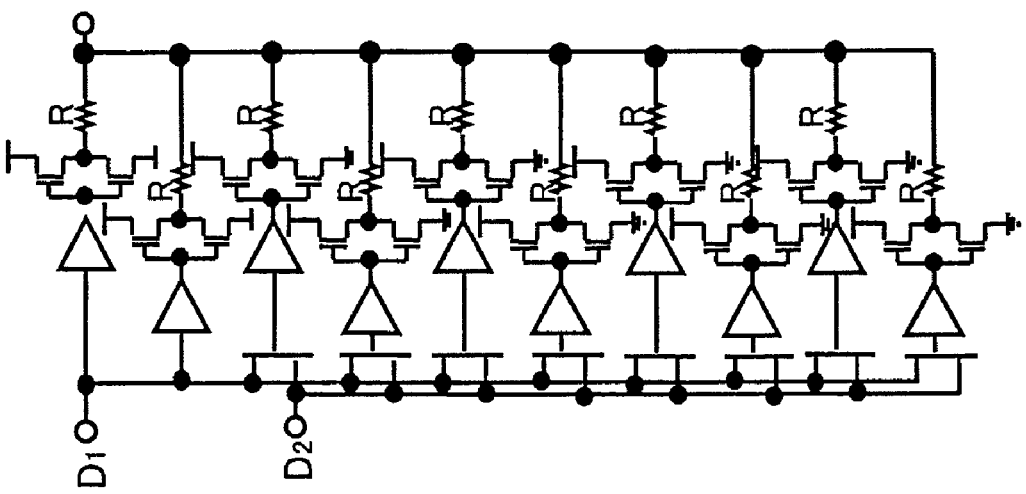
FIG. 10B is a view illustrating an output buffer circuit at an emphasis resolution of $1/10$.
Figure 10A:
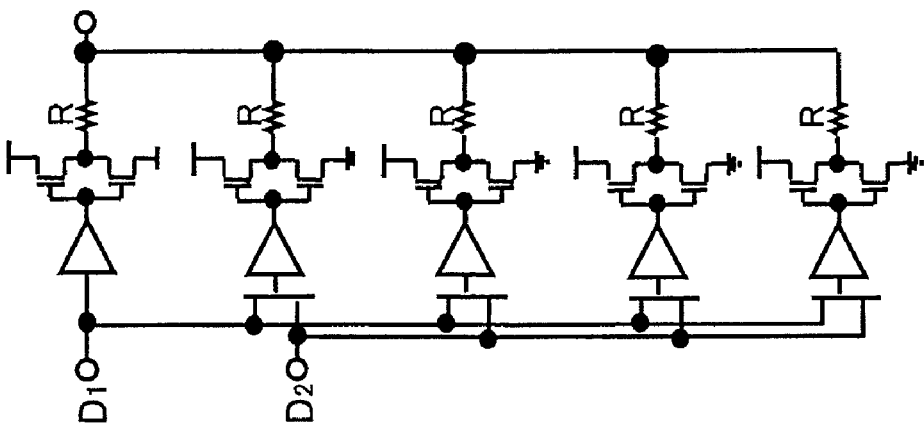
FIG. 10A is a view illustrating an output buffer circuit at an emphasis resolution of $1/5$.

FIG. 7 illustrates a detailed configurational example of the output buffer circuit according to the present embodiment. In FIG. 7, reference numeral 50 denotes a back plane substrate, reference numerals 51 to 54 denote daughtercard, reference numeral 55 denotes a connector and reference numeral 56 denotes a send/receive IC. Such a configuration compensates for damage to board wiring and performs pre-emphasis highlighting an edge of a waveform.

In the present embodiment, the output buffer circuit has been described, but using two systems of output buffer circuits, a differential output buffer is constructed to serve as a differential output buffer circuit.

Further, the present invention also provides an output buffer circuit having a regulation function, which includes the output buffer circuit and the regulation circuit and is configured so that a variable resistance portion of an output buffer in the output buffer circuit is adjusted by the regulation circuit.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. An output buffer circuit comprising:
an input terminal for receiving an input signal;
a delay circuit for delaying the input signal input from the input terminal for a certain period of time;
an inverter for inverting the input signal delayed for the certain period of time by the delay circuit;
an output buffer for receiving the input signal inverted by the inverter; and
an output terminal for outputting a signal from the output buffer which has received the input signal;
wherein the output buffer includes an output resistance, the output resistance including a variable resistance portion, wherein a pre-emphasis amount is changed by changing the variable resistance value,
wherein the output buffer circuit transmits a logical signal from the output buffer to a transmission line and generates a waveform having four or more types of signal voltages on a transmission side according to a signal attenuation amount of the transmission line, and
wherein the output buffer has a selector on a forward stage and the variable resistance portion of the output resistance and the inverter is configured to operate in cooperation with the selector to select a signal input into the output buffer by a selector logic, invert a data signal, adjust a top pre-emphasis amount by a select signal of the selector logic and change a pre-emphasis amount by changing a variable resistance value.

2. The output buffer circuit according to claim 1, wherein the output buffer has a selector at a forward stage and the variable resistance portion of the output resistance and is connected in two or more parallels.

3. The output buffer circuits according to claim 2, wherein the selector changes a resolution component with a large emphasis amount and the variable resistance portion of the output buffer changes a resolution with a small emphasis amount.

4. The output buffer circuit according to claim 3, wherein the output buffer has a selector at a forward stage thereof and includes a P-type transistor and an N-type transistor complementarily operated by an input signal connected between a high-level power supply and a lower-level power supply, the selector is configured so as to select a signal to be input into the output buffer by a selector logic with either one or both of a data signal indicating a logical value of a buffer output and an inverting signal of a data signal which has passed through a delay circuit as an input, the output resistance of each output buffer is determined so that a parallel synthetic resistance value of the output resistance of two or more output buffers becomes a desired pre-emphasis amount at a variable resistance portion before fine adjustment, the pre-emphasis amount of each tap is adjusted by a select signal of the selector logic and the transmission line is terminated by a terminating resistance connected to a terminating voltage at a receiving end.

5. The output buffer circuit according to claim 4, wherein the variable resistance portion of the output buffer includes a variable resistor connected between the P-type transistor and the output terminal and the N-type transistor and the output terminal.

6. The output buffer circuit according to claim 4, wherein the variable resistance portion of the output buffer is formed by connecting the P-type transistor having a variable power supply connected to a gate terminal between the P-type transistor and the high-level power supply, and the N-type transistor having a variable power supply connected to a gate terminal between the N-type transistor and the low-level power supply.

7. The output buffer circuit according to claim 1, wherein the variable resistance portion of the output buffer is constituted of a pass gate including a variable power supply and a transistor to make a resistance value of the pass gate variable based on a voltage value of the variable power supply.

8. The output buffer circuit according to claim 1, wherein a receiving end termination style of the transmission line is a Thevenin's termination connected to a high-level power supply and a low-level power supply.

9. A differential output buffer circuit, comprising two systems of output buffer circuits according to claim 1 to form a differential output buffer.

10. A regulation circuit, comprising:
two or more sets of replica set circuits, each of which has the same replica output buffer circuit as the output buffer of the output buffer circuit according to claim 1, a resistor and a voltage comparator; and
a switch for selecting one of the two or more sets of replica set circuits;
wherein a resistance value of the resistor in the replica set circuit is the product of a resistance value of a receiving termination resistance and a multiple of the number of the output buffers and is high twice or more thereof, the voltage comparator compares a termination voltage of a transmission line applied to a connection portion of the variable resistor of the replica output buffer circuit to the resistance of the replica set circuit with a voltage value of a half as large as a termination voltage of the transmission line to output a differential voltage,
wherein the regulation circuit is connected with the output buffer circuit according to claim 2.

11. An output buffer circuit with a regulation function, comprising:
an output buffer circuit comprising an input terminal for receiving an input signal;
a delay circuit for delaying the input signal input from the input terminal for a certain period of time;
an inverter for inverting the input signal delayed for the certain period of time by the delay circuit;
an output buffer for receiving the input signal inverted by the inverter; and
an output terminal for outputting a signal from the output buffer which has received the input signal;
wherein the output buffer includes an output resistance, the output resistance including a variable resistance portion, wherein a pre-emphasis amount is changed by changing the variable resistance value,
wherein the output buffer circuit transmits a logical signal from the output buffer to a transmission fine and generates a waveform having four or more types of signal voltages on a transmission side according to a signal attenuation amount of the transmission line, and
wherein the output buffer has a selector on a forward stage and the variable resistance portion of the output resistance and the inverter is configured to operate in cooperation with the selector to select a signal input into the output buffer by a selector logic, invert a data signal, adjust a top pre-emphasis amount by a select signal of the selector logic and change a pre-emphasis amount by changing a variable resistance value, and further comprising:
a regulation circuit comprising two or more sets of replica set circuits, each of which has the same replica output buffer circuit as the output buffer of the output buffer circuit, a resistor and a voltage comparator; and
a switch for selecting one of the two or more sets of replica set circuits;
wherein a resistance value of the resistor in the replica set circuit is the product of a resistance value of a receiving termination resistance and a multiple of the number of the output buffers and is high twice or more thereof, the voltage comparator compares a termination voltage of a transmission line applied to a connection portion of the variable resistor of the replica output buffer circuit to the resistance of the replica set circuit with a voltage value of a half as large as a termination voltage of the transmission line to output a differential voltage,
wherein the regulation circuit is connected with the output buffer circuit,
wherein the regulation circuit regulates a variable resistance portion of an output buffer in the output buffer circuit.

* * * * *